US 7,453,837 B2

(12) United States Patent
Jiang et al.

(10) Patent No.: US 7,453,837 B2
(45) Date of Patent: Nov. 18, 2008

(54) TRUNKING SYSTEM FOR CDMA WIRELESS COMMUNICATION

(75) Inventors: James Jiang, Richardson, TX (US); Yonggang Fang, San Diego, CA (US); Mary Chion, Belle Mead, NJ (US); Rajesh Bhalla, Westmont, IL (US)

(73) Assignee: ZTEIT USA, Inc., San Diego, CA (US)

( * ) Notice: Subject to any disclaimer, the term of this patent is extended or adjusted under 35 U.S.C. 154(b) by 1509 days.

(21) Appl. No.: 10/313,943

(22) Filed: Dec. 5, 2002

(65) Prior Publication Data
US 2004/0042438 A1 Mar. 4, 2004

Related U.S. Application Data

(60) Provisional application No. 60/404,095, filed on Aug. 15, 2002.

(51) Int. Cl.
*H04B 7/216* (2006.01)

(52) U.S. Cl. .......... 370/320; 370/327; 370/340; 370/441; 370/335; 370/337; 455/450; 455/452.1; 455/511; 455/519; 455/518; 455/426.1

(58) Field of Classification Search .......... 370/320, 370/342, 327, 340, 335, 441, 337; 455/518, 455/519, 426.1
See application file for complete search history.

(56) References Cited

U.S. PATENT DOCUMENTS

| | | | | |
|---|---|---|---|---|
| 5,711,011 A * | 1/1998 | Urs et al. | ............. | 455/520 |
| 5,815,799 A * | 9/1998 | Barnes et al. | ............. | 455/15 |
| 5,867,491 A * | 2/1999 | Derango et al. | ............. | 370/329 |
| 5,917,823 A * | 6/1999 | Benning et al. | ............. | 370/397 |
| 6,049,528 A * | 4/2000 | Hendel et al. | ............. | 370/235 |
| 6,115,370 A * | 9/2000 | Struhsaker et al. | ............. | 370/342 |
| 6,128,301 A * | 10/2000 | Bernstein | ............. | 370/395.61 |
| 6,131,012 A * | 10/2000 | Struhsaker et al. | ............. | 455/3.05 |
| 6,138,011 A * | 10/2000 | Sanders et al. | ............. | 455/426.1 |
| 6,178,327 B1 | 1/2001 | Gomez | | |
| 6,243,581 B1 | 6/2001 | Jawanda | | |
| 6,263,368 B1 * | 7/2001 | Martin | ............. | 709/224 |
| 6,292,671 B1 * | 9/2001 | Mansour | ............. | 455/518 |
| 6,421,335 B1 * | 7/2002 | Kilkki et al. | ............. | 370/342 |
| 6,538,606 B2 | 3/2003 | Quinn et al. | | |
| 6,553,234 B1 | 4/2003 | Florea | | |
| 6,738,617 B2 * | 5/2004 | Rosen et al. | ............. | 455/418 |
| 6,862,453 B2 * | 3/2005 | Collins | ............. | 455/453 |

(Continued)

FOREIGN PATENT DOCUMENTS

WO     WO03/101025     5/2003

(Continued)

OTHER PUBLICATIONS

IEEE 802.16-2004, "IEEE Standard for Local and Metropolitan Area Networks, Part 16: Air Interface for Fixed Broadband Wireless Access Systems", Oct. 1, 2004, 895 pages.

(Continued)

*Primary Examiner*—Marceau Milord
(74) *Attorney, Agent, or Firm*—Fish & Richardson P.C.

(57) ABSTRACT

Methods and systems for implementing trunking techniques in CDMA systems for handling group calls and push-to-talk services.

44 Claims, 10 Drawing Sheets

U.S. PATENT DOCUMENTS

| | | | |
|---|---|---|---|
| 6,882,856 B1 * | 4/2005 | Alterman et al. | 455/519 |
| 6,898,436 B2 * | 5/2005 | Crockett et al. | 455/518 |
| 6,917,819 B2 * | 7/2005 | Collins | 455/560 |
| 6,947,752 B2 * | 9/2005 | Collins | 455/453 |
| 7,035,664 B2 | 4/2006 | Kim | |
| 7,254,119 B2 | 8/2007 | Jiang et al. | |
| 7,343,163 B1 * | 3/2008 | Perkins et al. | 455/452.1 |
| 2002/0085516 A1 | 7/2002 | Bridgelall | |
| 2002/0152342 A1 | 10/2002 | Das et al. | |
| 2003/0050067 A1 | 3/2003 | Rozmaryn | |
| 2003/0065805 A1 | 4/2003 | Barnes, Jr. | |
| 2003/0133421 A1 | 7/2003 | Sundar et al. | |
| 2003/0134650 A1 | 7/2003 | Sundar et al. | |
| 2004/0259556 A1 | 12/2004 | Czys | |
| 2005/0096062 A1 | 5/2005 | Ji et al. | |

FOREIGN PATENT DOCUMENTS

| | | |
|---|---|---|
| WO | WO2004/017525 | 2/2004 |

OTHER PUBLICATIONS

IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1", Feb. 18, 2006, (864 pages).

* cited by examiner

Common Trunking Message Link Protocol Stacks

Dispatching Server

Dispatching Client

BTS/BSC

Access Terminal

TRUNKING SYSTEM FOR CDMA WIRELESS COMMUNICATION

This application claims the benefit of U.S. Provisional Application No. 60/404,095, entitled "ZTE CDMA2000 Trunking System Solution" and filed on Aug. 15, 2002, the entire disclosure of which is incorporated herein by reference as part of this application.

BACKGROUND

This application relates to wireless communication systems and techniques based on code division multiple access (CDMA), and in particular, to system architecture and configurations, management, controls, and operations of trunking systems for CDMA wireless communication.

Wireless communication systems use electromagnetic waves to provide communication with and between mobile communication devices, such as mobile phones. In CDMA systems, a spread spectrum technique is used to allow multiple mobile wireless devices to simultaneously occupy the same frequency spectral range without interference with one another. The bandwidth of this common transmission spectral range is intentionally made much wider than the minimum required signal bandwidth in a communication system. The power of each subscribed mobile wireless device is spread over the wide bandwidth. The spreading results in a relatively low power spectral density and thus reduces the adverse interference to another narrow band signal occupying the same frequency range.

Direct sequence CDMA systems use different code sequences in the forward and reverse links for spectrum spreading. In the reverse link from a mobile device to the network, a transmission signal from each subscribed mobile wireless device in a CDMA system is modulated with a unique pseudo-noise (PN) binary sequence code, which is essentially orthogonal to any other PN sequence designated in the system. This modulation causes the spreading over a wide bandwidth. The orthogonality of different PN sequence codes allows for multiple access within the same frequency spectrum and makes CDMA systems less vulnerable to interference. One unique feature of CDMA systems is that no definite limit exists on the number of users in the system. In practice, the PN sequence codes may not be perfectly orthogonal and the noise caused by cross-correlation of the PN sequence codes can set an upper limit on the system capacity. In the forward link, a transmission signal from each base station to a subscribed mobile wireless device is modulated with a unique Walsh code and is further scrambled with a PN code.

Similar to other communication systems, CDMA systems can use trunking techniques to have a number of users to share a relatively small number of communication paths. This sharing of system resources can improve the system capacity and increase the efficiency in utilizing the system resource. However, the degree of sharing in a trunking system tends to be restricted, in at least one aspect, by the desired grade of service measured by the ability of a user to access a trunked CDMA system, especially during a high traffic period. Moreover, maintaining the privacy of each user's communication may also present a constraint on the degree of sharing in a CDMA trunking system. Hence, proper trunking system design and implementation are important in CDMA systems and are becoming even more so as CDMA systems are migrating from primarily narrowband digital voice communication services to addition of broadband packet data services.

SUMMARY

This application includes system architecture, channel configuration, group call processing, authentication, billing, trunking group management, system configurations, management, controls, and operations of trunking systems for handling group calls through one or more packet data networks in wireless communication systems such as systems based on CDMA2000 standards. The packet data network may be configured to operate based on a proper packet data protocol, such as a carrier network based on the Internet Protocol (IP). such a trunking system may include a dispatching client module coupled between a base station controller (BSC) and the packet data network to direct voice packets generated during a group call to or from a dispatching service node. The dispatching service node may be implemented to include, among others, a dispatching server module coupled to the packet data subsystem to manage and execute at least a portion of operations for the group call.

This trunking system for handling the group calls may use a mechanism parallel to a packet data mechanism for handling the data packets via the same or a different packet data network. The packet data mechanism may include a packet control function (PCF) module and a packet data service node (PDSN) that are coupled between the BSC and the packet data network for transmitting the data packets. Hence, a CDMA system incorporated with this trunking system may include three different mechanisms to handle communication services. First, this CDMA system has a regular voice or data call handling mechanism with a mobile switching center (MSC) coupled between BSCs and a carrier public switched telephone network (PSTN). Second, the packet data mechanism including PCFs and PDSNs is used to handle transmission of data packets through one or more packet data networks. Third, the trunking system is used to manage and execute the group calls via the packet data networks which may be the same as or different from the packet data networks used by the second mechanism.

The above and other trunking systems of this application may be configured to provide, e.g., fast or instant system access for group calls such as push-to-talk (PTT) services, high channel efficiency by having groups of users to share communication paths including both CDMA2000 traffic channels and packet data networks, adequate user security during a group call under the sharing architecture, and flexible grouping mechanism for easy formation, modification, and termination of user groups for group calls. The trunking techniques for group calls of this application may be designed to be fully compatible with existing CDMA air interface standards in part to allow CDMA service providers to add the trunking systems to the existing systems and thus to provide additional services without interfering other services. The usage efficiency of communication channels based on such trunking techniques may be significantly increased by properly reducing the transmission power for both the forward link and the reverse link in the group calls. Notably, the sharing may be implemented to allow users in a user group to share a single communication link.

Accordingly, one implementation of a CDMA system includes at least the following three parts: a CDMA network, a packet data system, and a trunking system. The CDMA network may include a mobile switching center connected to a public telephone switching network to provide voice and data call services to mobile communication devices. The packet data system is coupled to the CDMA network to provide packet data services to the mobile communication devices. The trunking system is also coupled to the CDMA network. In addition, the trunking system is connected to a packet data network to provide group call services to the mobile communication devices via the packet data network.

More specifically, the trunking system in the above implementation includes dispatching clients and a dispatching server. The dispatching clients are coupled in communication with the CDMA network to transmit data packets of a group call to and from mobile communication devices of a trunking group where members of each group share a common trunking data link for transmission of data packets. The dispatching server is connected to said packet data network to communicate with the dispatching clients.

In another implementation, a trunking method for providing group call services in a CDMA communication system may include the following operations. The dispatching clients are connected to a CDMA system to dispatch group call requests via a packet data network to a dispatching server that controls and manages group calls. A common trunking message link through the packet data network is used to transmit trunking messages between a dispatching client and the dispatching server. In addition, a single trunking data link to each trunking group is established between the dispatching server and each dispatching client such that part of or all of the group members share the single trunking data link in transmitting user data over the packet data network.

These and other features, system configurations, control techniques, associated advantages, and implementation variations are described in detail in the following drawings, textual description, and claims.

DETAILED DESCRIPTION

The trunking techniques and systems of this application may be used to efficiently handle group calls, add various user functions and services associated with the group calls, and provide control and management functions for service carriers. Such group calls are made by subscribed users with mobile communication devices including mobile phones, Personal Digital Assistants (PDAs), and mobile computers and are handled through one or more packet data networks in CDMA communication systems that allow for both voice and data communications, such as CDMA systems based on various CDMA2000 standards. Applicable CDMA2000 standards include, but are not limited to, CDMA2000 1X, CDMA2000 1xEV-DO, and CDMA2000 1xEV-DV. The trunking techniques and systems of this application may also be applied to other CDMA standards with packet data functions that are either evolved from CDMA2000 standards or are compatible with CDMA2000 standards.

The hardware infrastructure for implementing the trunking techniques of this application includes a range of devices and modules in a CDMA system, examples of which are added circuitry in user mobile communication devices, group call dispatching clients and servers associated with a packet data network, and others in the dispatching service node. Such trunking hardware infrastructure can be designed and implemented as add-ons to CDMA systems to provide additional functions and services and is fully compatible with other features of CDMA systems. Hence, the operations of the trunking systems do not interfere with other operations, functions, and features of CDMA systems. Accordingly, the corresponding trunking control and management software modules are implemented at various locations in the hardware infrastructure to manage and control the group calls and other associated functions and services.

Figure 1:
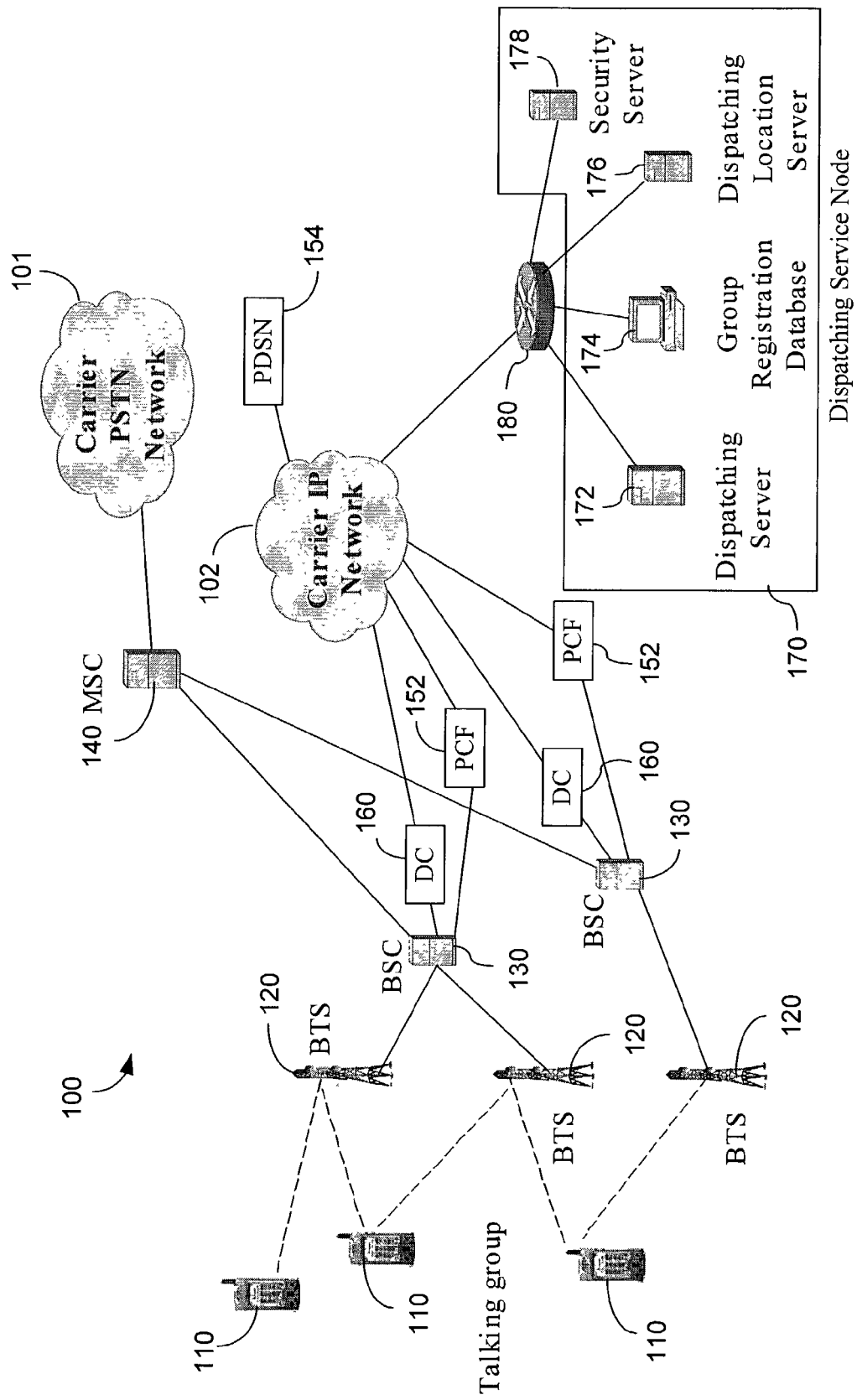
FIG. 1 illustrates a CDMA communication system 100 having an add-on trunking system for group calls according to one implementation of this application.

FIG. 1 illustrates a CDMA communication system 100 having an add-on trunking system for group calls according to one implementation of this application. Wireless mobile communication devices 110 of subscribed users in the system 100 receive and send communication signals for either or both of data and voice through base transceiver stations (BTSs) 120 over electromagnetic waves 112 in the air. The base transceiver stations 120 are distributed in a service area with multiple spatially divided cells to form a radio access network. Each cell may have one base transceiver station. Alternatively and more commonly for some CDMA systems, each base transceiver station 120 may be designed to have directional antennas and may be placed at a location on edges of multiple cells in a sectorized arrangement to cover these cells. A network of base station controllers (BSCs) 130 is connected, usually with wires or cables, to BTSs 120 for controlling the BTSs 120. Each BSC 130 is usually connected to two or more designated BTSs 120.

The next level up in the system 100 includes at least three communication control mechanisms connected between the BSCs 130 and two types of communication networks: one or more public switched telephone network (PSTN) 101 and one or more packet data networks 102. The first of the three control mechanisms includes at least one mobile switching center (MSC) 140 as a control interface between the BSCs 130 and the PSTN 101. To certain extent, the MSC 140 is essentially a switch that manages regular voice or data calls to and from the mobile devices 110 of subscribed users in the system 100. There may be one or more home location registers (HLRs) for storing permanent user profiles and visit location registers (VLRs) connected to the MSC 140 for storing temporary user profiles. The HLRs and VLRs are used to provide the MSC 140 with information on the subscribed users which may include tracking information on the locations of the users and their billing information. The Short Message Service (SMS) may also be provided through the MSC 140. The BTSs 120, the BSCs 130, and the MSC 140 form the basic CDMA network in connection with the PSTN network 101 to provide voice call and certain data services to the mobile devices 110.

The second of the three control mechanisms in the system 100 controls packet data services through the packet data network 102 such as an IP network. This control mechanism is illustrated to include packet control function (PCF) devices 152 and a packet data serving node (PDSN) 154 that are coupled to the basic CDMA network. Each PCF 152 can be connected between the BSC 130 and the PDSN 154 in general and may be integrated with the BSC 130 as a single device. The PDSN 154 may be generally configured to provide packet data communications over the radio access network and through the packet data network 102, and to execute functions for authentication, authorization, and accounting (AAA) through a connected AAA server. The basic functions of this mechanism and the MSC 140 are specified by CDMA2000 standards.

The third control mechanism in the system 100 constitutes part of the add-on trunking system for controlling and handling group calls and related functions and services through the packet data network 102. This mechanism includes dispatching clients 160 and a dispatching server 172 that are coupled to the basic CDMA network. Each dispatching client device 160 is connected between a corresponding BSC 130 and the dispatching server 172 through the packet data network 102. Like the PCF 152, the dispatching client 160 may be either a device separate from the BSC 130 or physically integrated with the BSC 130 as one module. As illustrated, the dispatching server 172 may be a part of a dispatching service node 170 to operate in combination with the dispatching clients 160 to control and manage the majority of the functions and services of the group calls in the trunking system. The dispatching service node 170 in this implementation may also include a group registration database 174, a dispatching location server 176, and security sever 178. A routing device 180, which may be implemented as part of the packet data networks 102, is connected to the dispatching service node 170 to operate as a switching interface to various devices within the node 170. The system 100 may include a single centralized dispatching service node 170 to serve all dispatching clients 160, or alternatively, use two or more distributed dispatching service nodes 170 to respectively cover different groups of dispatching clients 160.

This trunking system within the CDMA system 100 provides special services and controls for group calls made within designated trunking groups of subscribed users. A trunking group may be formed and defined by the subscribed users and may be changed in various ways by the group members. Examples of such trunking groups include members of an organization such as a government agency, a private company, a school or a department within a school, members of interest groups such as family members and relatives, friends, hobby groups, and others. Notably, the trunking system can be designed to assign a single trunking communication link to a group and all members of the group share that single link. This sharing increases the channel usage efficiency. A half-duplex radio system is generally used for the group calls to provide instant, effective, and private communications. Since the group calls are handled through the packet data network 102, the privacy of the data in group calls may be protected by user data encryption.

The BTSs 120, in addition to providing radio access for other services such as the full-duplex radio communication links for regular phone calls, can be controlled to provide the half-duplex radio links for the group calls and as an conduit to access the packet data network 102 through the BSCs 130 and the dispatching clients 160. Each dispatching client 160 is programmed with trunking control software to achieve the half-duplex radio communication for group calls, the access to the packet data network 102 for the group calls, and broadcast of forward link data to group members within BSC 130. The dispatching server 172 can be configured as the control center for the trunking system and operate to receive messages on group calls from various dispatching clients 160 as in the initial contact point for the group calls and to dispatch user data (e.g., voice packets) received from a reverse link to forward link. The voice packets may be duplicated and then the duplicated packets are dispatched on a forward link. The dispatching server 172 may also be programmed with an arbitration mechanism to arbitrate requests for the push-to-talk (PTT) from members in a group since a single half-duplex link is shared by all group members.

The general functions of other devices in the dispatching service node 170 may be configured to include the following features. The group registration database 174 stores group information including identification for groups and membership information of each group, and provides such group information to the dispatching server 172 for handling group calls. The dispatching location server 176 stores and updates information on locations of group members. The dispatching server 172 uses the location information and the group information for setting up a group call. In an alternative implementation, the dispatching location server 176 may be combined with the group registration database 174 as a single module in the node 170. The dispatching location server 176 records duplicated location information sent by the BSC 130 to the MSC 140 and operates to speed up the setup process of the group calls. When the BSC 130 sends RegistrationRequest or Locatoin UpdateRequest to MSC 140, the BSC duplicates the messages and sends the duplication to the server 176. The server 176 may record the following information: group ID, group member ID, mobile IMSI, CellID, LocationAreaID, and Slot_Cycle_Index. The server 176 may be located with the node 170 as separate device connected to the packet data networks 102 as shown, or integrated with either of the server 172 or the database 174. The security server 178 authenticates and authorizes the membership of each group and screens out access to group calls by subscribed users outside groups.

The above trunking system infrastructure allows the system 100 to fully comply with CDMA2000 standards and to add group call features with both service control and user functions. Examples of the group call features include, for example, operational control, system services, user control services such as calling privileges and connection confirmation tone, user services such as group speed dials and group call waiting and forward.

As illustrated in FIG. 1, a single dispatching service node 170 with one dispatching server 172 may be connected to multiple dispatching clients 160 via the packet data network 102. The dispatching service areas for group calls may be divided into local dispatching service areas and global dispatching service areas. A local dispatching service area may be a relatively small geographic region such as a city, town, or a specified urban area. A local dispatching service area can be larger than the coverage areas of a MSC 140 or PDSN 154. A single dispatching service node may be sufficient to serve a local dispatching service area. A global dispatching area generally involves greater geographic areas where a single dispatching server is insufficient for handling all group calls. Hence, multiple dispatching servers within the network are designed to respectively handle group calls in different smaller service areas. The dispatching servers may be connected by the packet data network 102 and need a special connection among dispatching servers. Such a global dispatching service area may be a worldwide CDMA area.

Notably, a secured connection is established between a dispatching server 172 and its subordinate dispatching clients 160. This can reduce the latency delay in the packet data networks 102 which may be an IP network. In the implementation shown in FIG. 1, a PDSN 154 is intentionally not placed in the communication route between the dispatching sever 172 and each client 160 to further reduce the latency delay. The signaling interfaces between the BSC 130 and the dispatching client 160 may use the same A8/A9 interfaces between BSC 130 and PCF 152 where the A8 interface provides a path for user traffic for voice packets in the group calls and A9 interface provides the corresponding signaling connection. Similarly, the A10 interface, which is conventionally used between PCF 152 and the PDSN 154, is used here to provide a path for user traffic between the client 160 and the server 172; the A11 interface, which is also conventionally used between PCF 152 and the PDSN 154, is used here to provide a signaling connection between the client 160 and the server 172. One advantage of this A8/A9 and A10/A11 design is that PCF and PDSN hardware may be used for the dispatching clients and servers but programmed with special trunking software for handling the group calls. Another advantage of this design is to provide the flexibility in the network configuration to allow for integration of trunking services with the normal packet data services, or separation of the trunking services from existing packet data networks to reduce latency caused by normal packet data services. However, it should be understood that suitable link interfaces other than A8/A9 and A10/A11 may be used for signaling connections between the dispatching client 160 and the BSC 130 and between the dispatching client 160 and the dispatching server 172.

Figure 2:
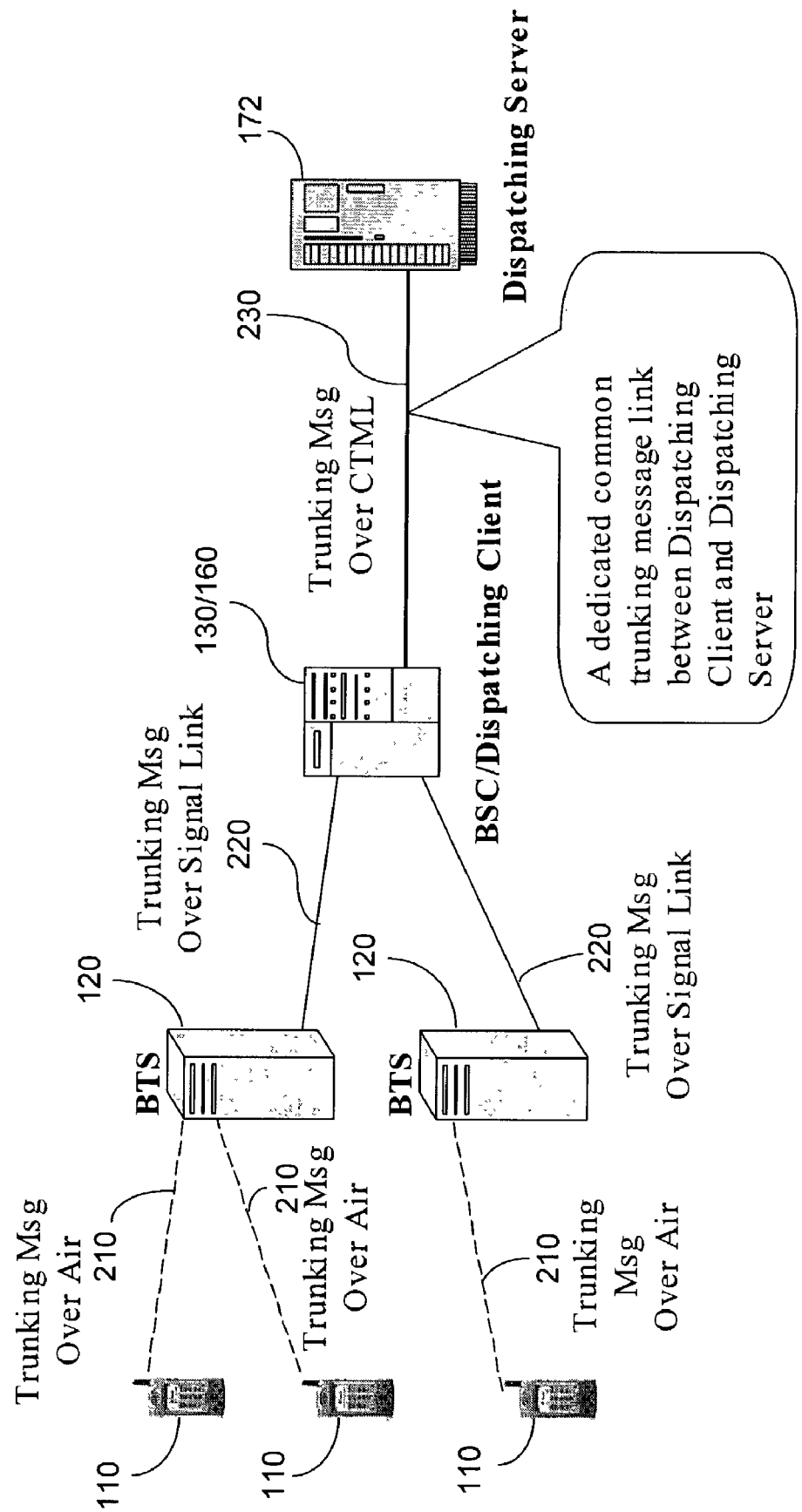
FIG. 2 shows a dedicated common trunking message link (CTML) used between the dispatching client and the dispatching server in the trunking system in FIG. 1 according to one exemplary implementation.

Another feature of the present trunking system is the implementation of a common channel signaling mechanism for handling trunking messages over the packet data networks 102. A voice frame link sharing is also provided for the forward link user data. FIG. 2 illustrates this feature where the link 210 between the user communication device or mobile station 110 and the BTSs 120 is the air radio channel for carrying the trunking messages, the link 220 between the BTS 120 and the BSC 130 is wired link for carrying the trunking messages, and a dedicated common trunking message link (CTML) 230 is used between the dispatching client 160 and the dispatching server 172. The CTML 230 may be established over the packet data network 102 during the system setup. The dispatching client 160 routes all trunking messages from BSC 130 through the CTML 230 to the dispatching server 172. In addition, the dispatching server 172 uses the same CTML 230 to send trunking messages back to BSCs 130.

Figure 3:
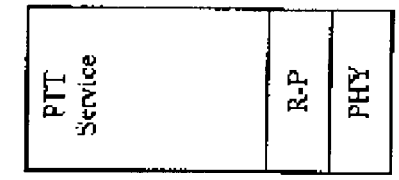
FIG. 3 shows the common trunking message link protocol stacks in the trunking system in FIG. 1 according to one exemplary implementation.
Figure 3:
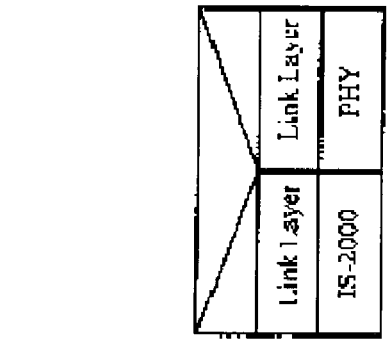
Figure 3:
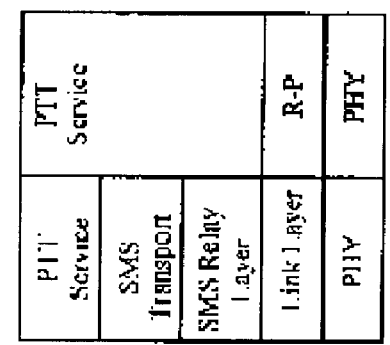
Figure 3:
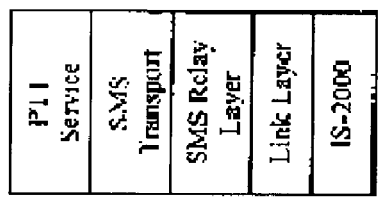

The corresponding trunking message system based on the above links may use the Short Data Burst (SDB) or Short Message Service (SMS) framework. Notably, the present trunking system does not use a PPP (point-to-point protocol) layer in the protocol stack between the dispatching server 172 and the dispatching clients 160 to reduce overhead and to increase the data throughput. Hence, the PPP connection is terminated at each dispatching client 160 and the data packets in the trunking system do not have the PPP headers. FIG. 3 shows the common trunking message link protocol stacks. The basic information trunking message routing includes the category information which defines a new service category for the trunking group calls and address information which has both trunking group addresses for identifying trunking groups and trunking group member addresses for identifying group members. The trunking group address is the field of origination or destination address and is owned and shared by the members within the group. The trunking group member address is owned by the particular group member and is the field of origination or destination sub-address.

A trunking message router may be used to route the trunking messages. This router may be implemented as a control software module for carrying out the routing operations and may be located within the BSC 130. The message routing function in the router can be designed to separate trunking messages using normal SDB format from normal SDB messages based on the service category. The router directs normal SDB messages to the signal connection control part (SCCP) of MSC 140 and trunking messages to the CTML 230 on dispatching client 160.

Figure 4:
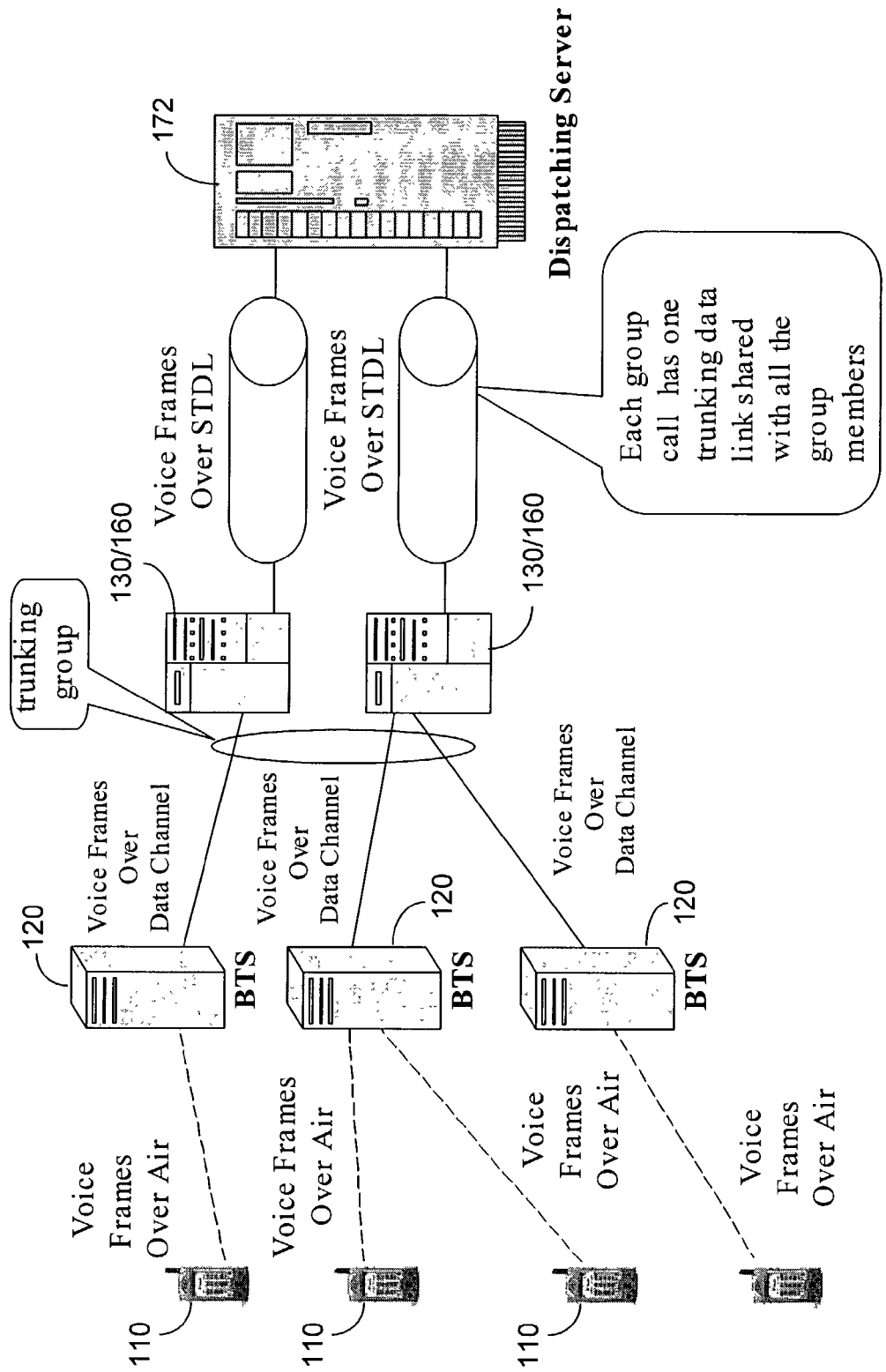
FIG. 4 illustrates the sharing of a trunking data link by all group members in a group call in the system in FIG. 1 according to one exemplary implementation.
Figure 5:
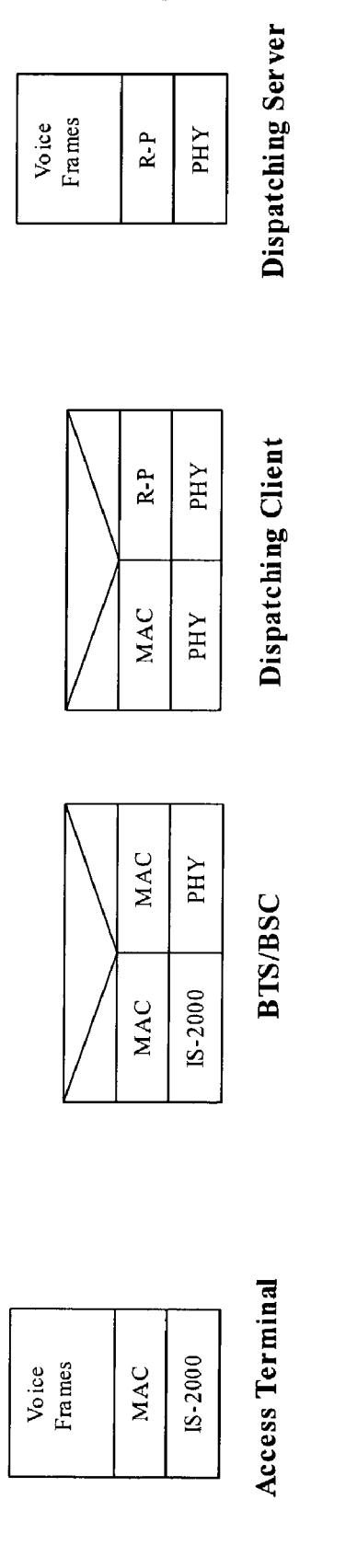
FIG. 5 further illustrates the shared trunking data protocol stacks according to one exemplary implementation.

The routing of the trunking data may be designed to use shared trunking data links (STDLs), where each group call has a single trunking data link between each dispatching client and the dispatching server and shared by all group members. This sharing allows for high efficiency in utilization of system resources and thus increases the system capacity. FIG. 4 illustrates this sharing mechanism. FIG. 5 further illustrates the shared trunking data protocol stacks, where "MAC" is the medium access control layer which is the lower sublayer of the data link layer and operates to use the physical layer (PHY) to provide services to the logical link control.

In this sharing mechanism, each trunking group call is assigned with its own A10/A11 link between the client 160 and the server 172 and each trunking group member has its own A8/A9 link between the BSC 130 and the client 160. The corresponding dispatching client includes a mapping table to map multiple A8 links (N) for the group members to a single A10 link for the group, i.e., an N-to-1 mapping. In operation, when the dispatching client 160 receives voice frames from any A8 link, the control software directs the client 160 to find the associated A10 link for that group and to route frames on that found A10 link. On the other hand, when the client 160 receives voice frames from the sever 172 through an A10 link, the client 160 finds all A8 links of a trunking group associated with the A10 link and distributes the voice frames on all the A8 links. Accordingly, the dispatching server 172 maintains an A10/A11 link lookup table for each trunking group call. When the sever 172 receives voice frames from any A10 link, the lookup table is searched to get all A10 links for the group and then the voice frames are sent to all A10 links in the table.

The system 100 in FIG. 1 can be configured to support two types of trunking groups based on the frequency of change in the group members: permanent groups and temporary groups. Based on the different group characteristics, different control and management mechanisms are used. A permanent trunking group does not change the members frequently based on a predetermined criterion and typically includes talk groups with a large number of members or talk groups for stabilized organizations such as corporations (e.g., taxi companies) and municipal agencies (e.g., police department). The control and management of permanent groups may be designated to the network operators, i.e., the service providers. The network creates and maintains permanent groups by, e.g., assigning a group identification (GID) number to each permanent group for setting up the group calls, and assigning a member as the group head for each permanent group. The group head is authorized to add or remove a group member at any time. This change in the group membership is sent via SDB messages to the group registration database 174 in the dispatching service node 170 shown in FIG. 1. The network operators may be able to maintain the group membership.

By contrast, much flexibility may be given to a temporary trunking group. For example, any subscribed user can use the mobile station to create and maintain a temporary group which is not registered in the group registration database 174.

To identify a temporary group call, the network assigns a temporary GID to the temporary group call. Different from the permanent groups, any user can initiate a group call via a SDB message to the server 172, where the SDB message includes a list of phone numbers for the temporary group. In addition, there is no SDB message to the group registration database 174 when a change in the group membership is made.

To implement the trunking system, each user device or mobile station 110 may be designed to include proper circuitry and special trunking software to support the group calls. Each device 110 may include a push-to-talk (PTT) button to activate the group call function. A group call may be set up as follows. First, a mobile user in a trunking group pushes the PTT button to send a Group Call Request message to the dispatching client 160. This request may contain a special service option to distinguish from other services such as the regular calls handled by the MSC 140 or packet data services handled by the PDSN 154. Upon receiving the request from the client 160, the dispatching server 172 pages all group members and brings them on line. At this point, the following traffic channels are established for the group call: one forward dedicated control channel for each group member, one forward common channel shared by all group members of the group, and one reverse dedicated control channel for each group member.

The group call setup makes a fast group call connection which includes a group call paging, parallel authentication, and disablement of the slotted mode during the dormant state. The group call paging, in one aspect, operates to locate and page group members of a group call. The dispatching server 172 receives the location information of group members from the DLS 176 and sends this information in a GroupConnectionRequest message to the dispatching client 160. The client 160 sends ConnectionRequest with member location information to assist BSC 130 to locate and page group members via a SDB message. The ConnectionRequest is then sent to each mobile in the group. In one implementation, the paging channel may check all SDB messages and consolidate the ConnectionRequest messages so that only one ConnectionRequest message is sent out per group per slot.

Another aspect of the group call paging is to disable the slotted mode of each mobile in the trunking group in which the group call is requested. During a normal slotted mode, a mobile's receiver sleeps and wakes up periodically in a slot cycle to check on the paging channel if it is being paged. When the group call will enter dormant state, mobiles in the group call will automatically disable the slotted mode, release traffic channels and enter idle state. But all the STDLs for the group call still remain connected. During dormant state, all the mobiles in the group monitor the paging channel on every paging slot and are able to receive Connection Request message on every paging slot in order to provide fast group call setup.

In general, the trunking system should authenticate a group call. Two kinds of authentication may be provided. First, the GID for the group call is authenticated by the dispatching server 172 and the registration database 174. This operation determines that if all group call users have subscribed to the group call service and checks if group call users belong to the trunking group. If both conditions are satisfied, the group call setup continues. Otherwise, the dispatching server 172 terminates the group call setup and send the Group Call Deny message back to the originator. The second authentication is the parallel authentication executed during the fast group call connection where it authenticates the mobile station registered in the network for the group call. This is done in the MSC 140 as normal voice or data call authentication through a ServiceRequest message during the group member paging by having BSC 130 to send the ServiceRequest to MSC 140.

Next, the group call is carried out. In operation, the dispatching server 172 has an arbitration mechanism to assign priority to requests for group calls and grants only one user to send its data on the reverse link at any time during the group call. This arbitration may be based on a "first-come-first-serve" scheme. Alternatively, certain group members may be given special priority over other group members. Any granted user data on the reverse link is dispatched on the shared forward link to all group members. Hence, after a mobile sends PTT Request Message to the dispatching server, the dispatching server responds by sending a PTT Grant Message to all group members with a Granted Member ID. Upon finishing talking in a group call, the mobile sends a PTT Release Message and is ready to receive user data from others.

A group call can be released by two modes. A normal release can be accomplished only by the group head. The group head sends a group call release message via SDB to the dispatching server 172 which in turn releases all the resources related to the group call. A group call may also be forced to release prior to receiving a release signal from the group such as the group head. For example, a forced release may be executed after the group call remains in the dormant state for a specified period. The dispatching server 172 can force the group call to release when the dormancy timer expires. As another example, the group call may be forced to release when there is a shortage of system resources.

The present system allows for a number of maintenance features during a group call. For example, the group head is allowed to add a new group member during the call. Also, a group member is allowed to join the group call during conversation even if the member could not to join the call during the setup state. Active joining is supported where a registered mobile station of a group can send a message to the dispatching server 172 when the mobile is in service and the server 172 can page the mobile station to join the group call. Passive joining is also supported where the dispatching server 172 periodically pages the absent group members to join the call. A group member can exit a group call early by sending a SDB message to the dispatching server 172. After the exit, the dispatching server 172 will not deliver the group call data to the member who has quit and will not page the mobiles. A group head may also be allowed to quit a call while other members stay on the group call. Furthermore, a group member may also re-join a group call by pushing the PTT button to send a SDB message to the dispatching server.

Billing of group calls may be implemented through the MSC 140. Each group member may be counted separately for the link usage in a group call. The BSC 130 sends a ServiceRequest message to MSC 140 for each group member during the group call setup, where the ServiceRequest message includes a special Service Option for the group call. In addition, the BSC 130 sends a ClearRequest message to MSC 140 if the group call is released or is dormant or a group member quits the group call. The group call billing is done during the post processing in the billing center and may apply different billing rates for group calls than other calls and may apply different group call billing rates for different groups.

The following sections describe features of the group call air interface, including forward traffic channel, reverse traffic channel, handoff, and frame offset.

The forward traffic channels in a group call may include one forward dedicated control channel (F-DCCH) for each trunking group member and one forward supplemental channel (F-SCH) shared by members of a trunking group. The forward channels, both F-DCCH and F-SCH, may use the same common long code sequence for all trunking group members in a group call. Each PTT device in a trunking group has its own Walsh code for F-DCCH and all PTT devices in a trunking group share the same common Walsh Code for F-SCH. The F-DCCH carries the signaling messages for trunking operations and the power control information for each group member. This channel is established during the setup of a group call.

Figure 6:
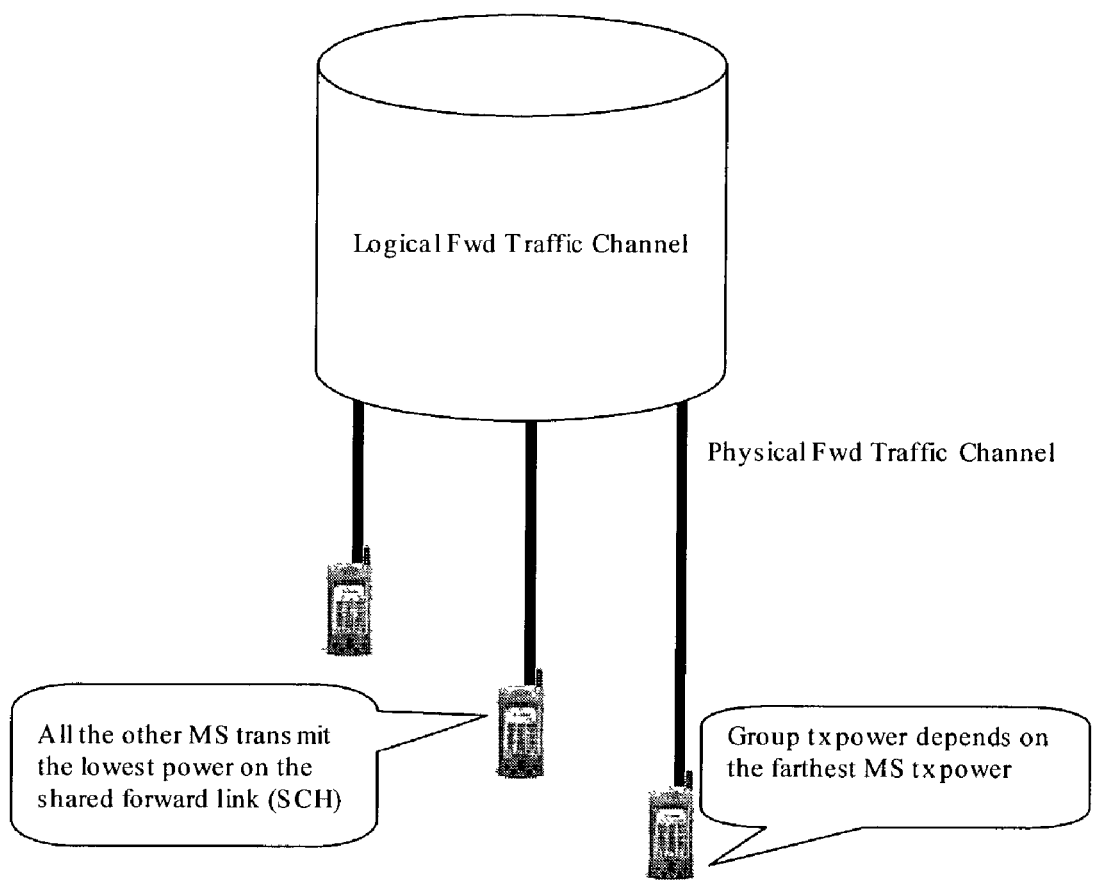
FIG. 6 illustrates the mapping of the physical F-SCH and the logical F-SCH according to one exemplary implementation.

The F-SCH as a physical channel is used to carry user data of group calls. Notably, each member of a trunking group has its own physical forward channel element resources to process forward traffic frames. All the group members share one logical or virtual Forward Supplemental Channel (F-SCH) by using the same common long code sequence and the same common Walsh code in the same sector in the sectorized cell arrangement. The dispatching server is programmed with an arbitration mechanism to manage the use of the F-SCH shared among the group members. FIG. 6 illustrates the mapping of the physical F-SCH and the logical F-SCH. At the radio link control layer, the logical F-SCH is the sum of all physical F-SCHs in the same sector and there is one logical F-SCH per sector. The F-SCH is established when the group call is established. More specifically, the logical F-SCH is established among the group call and physical F-SCH is established for each group member.

One feature of the air interface for the trunking system is to utilize the power control mechanism in the underlying CDMA system to minimize the transmission power on both forward and reverse links. On the forward traffic channel, an individual closed power control loop, the forward link power control (FLPC), is independently applied on each of the F-DCCH and F-SCH. A primary power control channel is used to control the power on the F-DCCH and a secondary power control channel is used for the F-SCH. On the shared F-SCH, a trunking device can receive or combine other users' F-SCH even if its own F-SCH is transmitting at the lowest power level. The closed loop power control is enabled on each physical F-SCH to keep the transmission power at the lowest on the channel element used for a mobile station 110 closer to BTS 120 and to maintain the minimum required transmission power of the channel element for the mobile station 110 that is farthest from its BTS 120. Under this control scheme, the total transmission power on the F-SCH for the group call depends on the transmission power of F-SCH assigned to the farthest mobile station 110. In addition, the outer loop power control is enabled on the forward supplemental channels to maintain the frame error rate within the required range for the CDMA system.

The reverse traffic channel in a group call may be implemented in two different configurations. In the first configuration, a single reversed dedicated control channel (R-DCCH) is assigned to each group member and is used to carry the signaling message, the power control information, and the user traffic. In the second configuration, two reverse traffic channels, a R-DCCH, and a R-SCH, are used. The R-DCCH is used to carry signaling message, and the power control information. The R-SCH is used to carry the user traffic. Similar power control techniques used for the forward channels may be applied here to minimize the transmission power on the reverse link.

Both soft and softer handoffs are supported in the trunking system. All forward and reverse channels are controlled to perform soft and softer handoff together. The handoff operations are configured to comply with CDMA2000 standards (e.g., IS-2000) and to add additional features. One added feature is that all legs involved in soft and softer handoff for a group call use the common long code sequence and a common Walsh code is used by all group members in the same sector for the F-SCH. When a mobile station is in soft or softer handoff with multiple sectors, its forward power control impacts the forward transmission power of the common F-SCH on all sectors. The BTS and BSC are controlled to use an algorithm to calculate the required transmission power on a new F-SCH. The BTS assigns the transmission power on the new physical F-SCH with a value equal to the required transmission power less the current transmission power on the virtual F-SCH in the new sector. If the value is less than zero, a transmission power of zero is assigned. As for the frame offset, all group members in a group use the same frame offset.

In addition to the above channel sharing, the present trunking system further improves the efficiency of utilizing the system resources by implementing a dormancy mechanism. Two timers are used to monitor the group call activities. The first timer is an inactivity timer for monitoring the activity of a data link on the group call. When the inactivity timer expires, the group call is marked as being in a dormant state. At this point, a second timer, a dormancy timer, is started to monitor the dormant group call and to control the group call in the dormant state. When the dormancy timer expires, the group call is completely released from the dormant state. Either one or both of the timers may be configurable. The configurable dormancy timer may be longer than the inactivity timer to ensure quality of service of the group calls.

In one implementation, when there is no data being transmitted over the data link in a group call, the inactivity timer is initiated so that the group call is set from an active state to an inactive state. In the inactive state, the system maintains a minimum transmission power by only transmitting forward and reverse link power control signals and the reverse link pilot while keeping all physical channels alive. When the dormancy timer starts running for a dormant state, the system can be configured to releases at least one and maybe all physical channels from the dormant group call. Hence, when the group call is re-activated from the dormant state, all physical channels need to be setup again if they are all released.

The inactivity timer may be configured to have a desired timer period, e.g., based on the needs of the cellular carriers. The length of this timer represents a tradeoff between the usage of the radio resources and latency of the PTT requests. When the inactivity timer is short, the group call enters dormant state more frequently. This strategy can save the radio resources. However, since the latency is much greater for the first PTT request when the group call is re-activated from dormant state, the average latency is increased. If, on the other hand, a longer inactivity timer is set, the average latency is reduced as the expense of limited radio resource for other group calls and services. On balance, it may be desirable to configure a long time for the inactivity timer to reduce the average latency in setting up a group call. When there is shortage on air link capacity or channel element resources, the radio resource manager/dispatching server may initiate to bypass the long inactivity timer by placing the group call to dormant state prior to expiration of the inactivity timer.

In implementation of above trunking system, the mobile stations, the air interface, and the network interface may be specially configured to meet certain requirements. In the mobile stations, the long code mask registers for the forward traffic and reverse traffic channel may be allowed to configure to different values. The call flow needs to be changed to accommodate group call processing. Each mobile station may support a new service option for the group call which allows the group call voice frames to be transmitted over R-DCCH and received from the F-SCH. As for the network interface, FIG. 1 shows that, in addition to the PCF 152 and PDSN 154 for regular packet data services under various CDMA2000 standards, the present trunking system adds dispatching server 172 and clients 160 to handle group calls via the packet data network 102.

The trunking system is designed to use trunking messages such as group setup messages, group call messages, and PTT messages in SDB format for communication between trunking devices and dispatching clients/servers. The group setup messages include the group member add message (ACH, EACH, R-DCCH) and group member remove message (ACH, EACH, R-DCCH). The group call messages include Group Call Request message (ACH, EACH), Group Call Connection message (PCH), Group Call Release message (F/R-DCCH, PCH, ACH, EACH), Group Call Deny and Group Member Release message (R-DCCH). The PTT messages include PTT Request (R-DCCH), PTT Granted (F-DCCH), PTT Release (F/R-DCCH), and PTT Release-Ack (F/R-DCCH).

Another desired feature of the trunking system is the voice loop-back avoidance mechanism. During the group call conversation, the originating mobile station may be prevented from receiving its voice data dispatched on the F-SCH. The loop-back data is analogous to an echo and is undesirable in most applications. The originating mobile station uses PTT Release message to indicate to Dispatching Sever the completion of data transferring from the reverse link. The dispatching server uses the reliable delivery of PTT Release-Ack message to notify the originating mobile station when it completes its dispatching the originator's data on F-SCH and it receives PTT Release message from the originating mobile station. The originating MS is allowed to receive other users' data on the F-SCH after it receives the PTT Release-Ack message. The mobile station can start a Loop-back Avoidance timer after sending the PTT Release message. If the timer expires and the PTT ReleaseAck is not received, the MS can disable the timer and allow to receive users' data on F-SCH.

Figure 7:
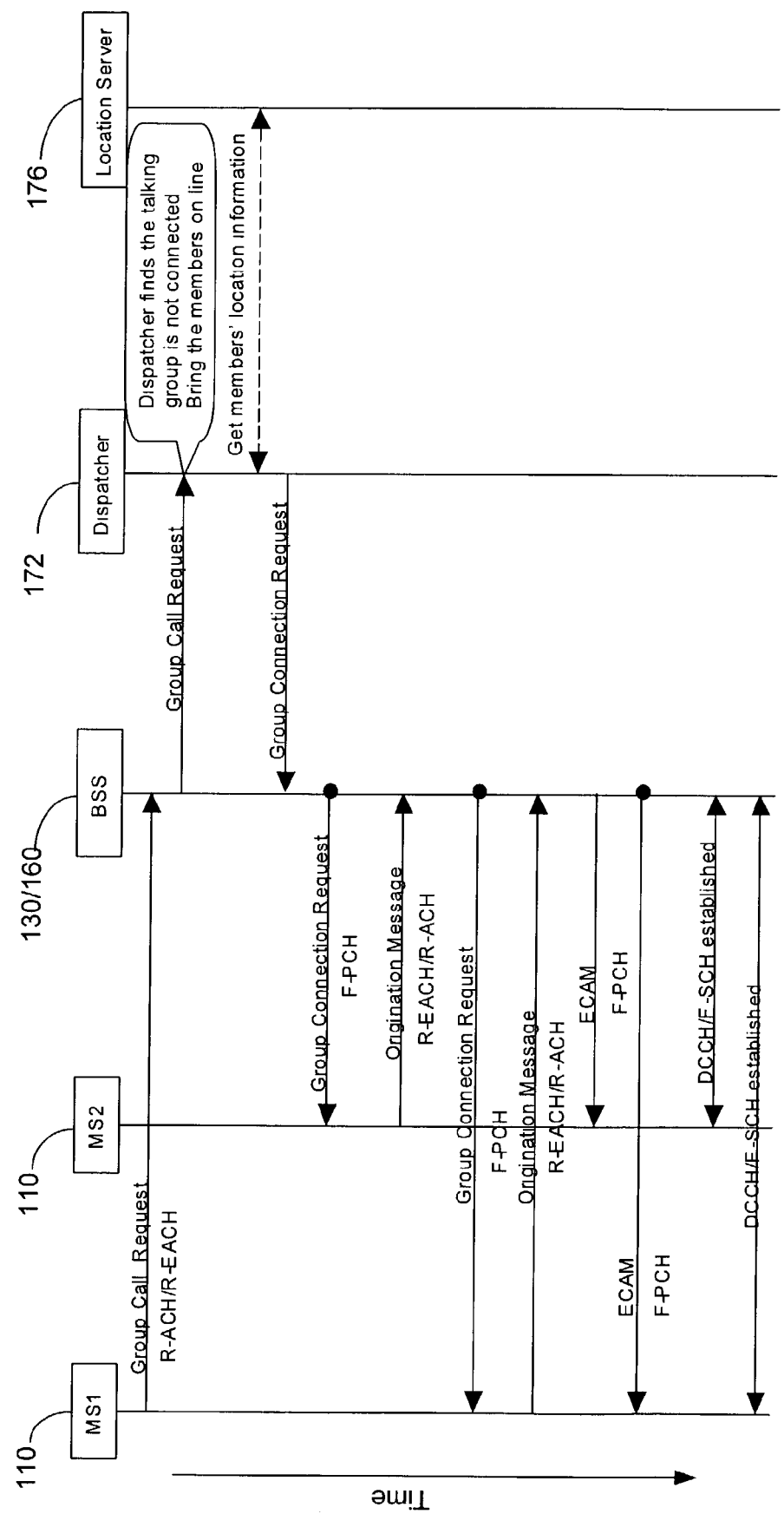
FIGS. 7 and 8 respectively show the operation flows for setting up a group call and for setting up a PTT based on the above trunking system.
Figure 8:
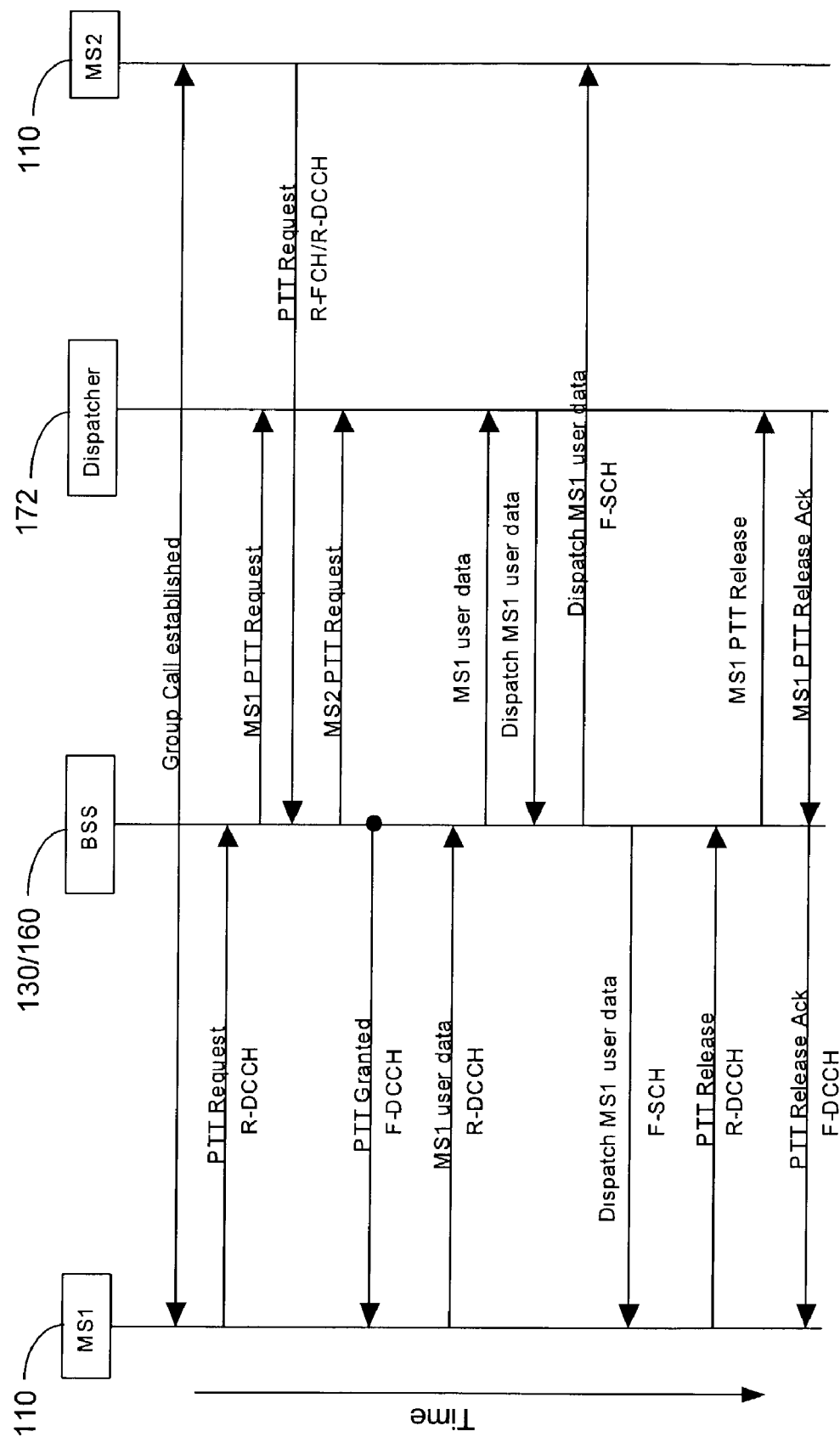

FIGS. 7 and 8 respectively show the operation flows for setting up a group call and for setting up a PTT based on the above trunking system. The arrowed line represents direction of the each communication channel or signal. The text above each arrowed line represents the content or operation of each signal and the text below each arrowed line is the name of the signal or channel. For example, "F-PCH" represents the forward paging channel and "ECAM" represents extended channel assignment message. The control mechanism for the operations in FIGS. 7 and 8 and other control functions may be implemented as machine-readable programming instructions or software modules in storage units at various locations in the system in FIG. 1 to control the hardware devices.

Figure 9:
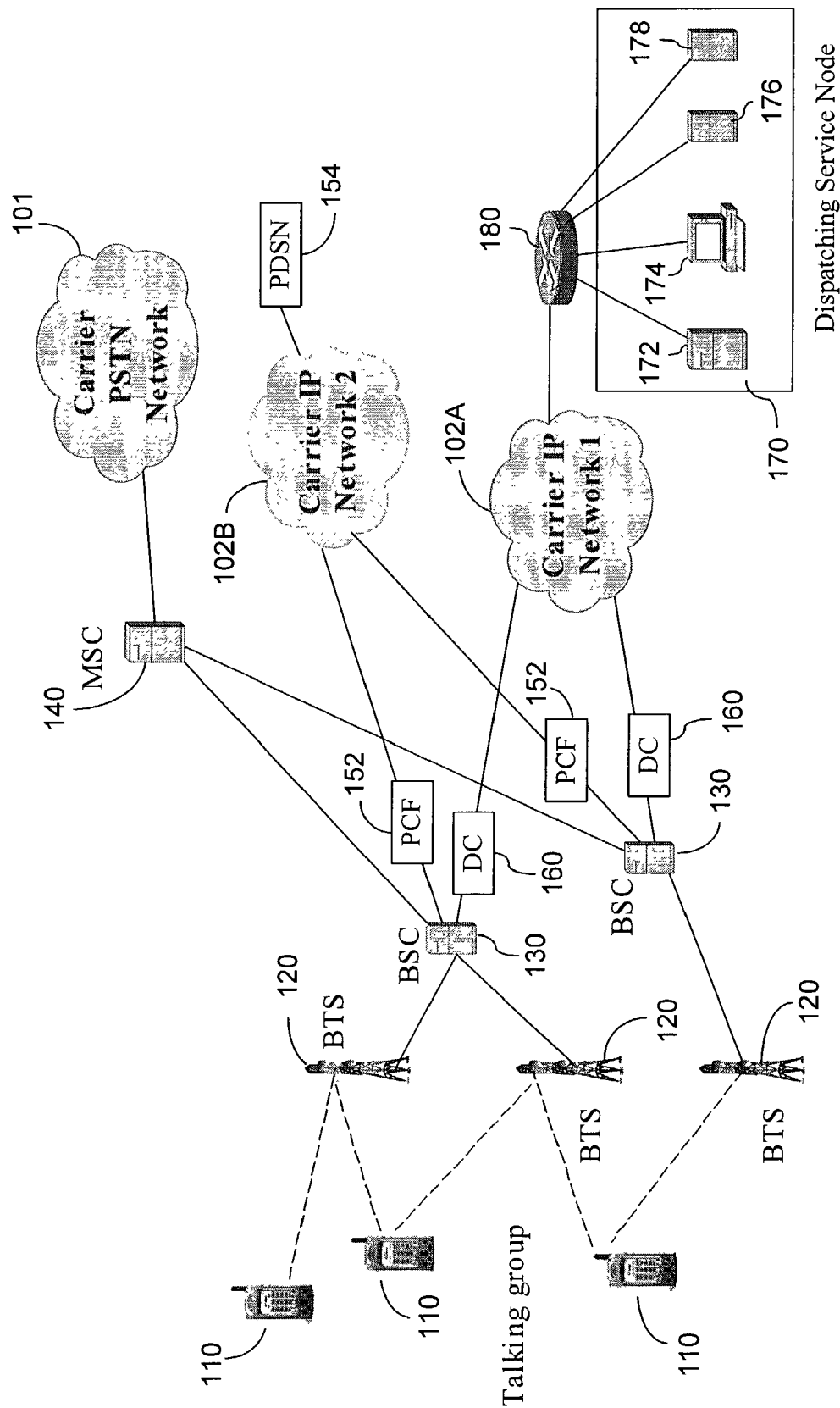
FIG. 9 shows an alternative system architecture for the trunking system in FIG. 1.

In the above trunking system shown in FIG. 1, the PDSN 154 and the dispatching service node 170 are shown to share the same packet data network 102. Under this network configuration, the PTT voice data packets in the trunking system and the data packets for the normal data services are routed through the same network 102. When there is a high traffic in the shared network 102, the quality of service for both normal data services and the PTT services may be adversely affected. FIG. 9, however, illustrates an alternative system architecture where two separate packet data networks 102A and 102B are implemented to eliminate the above sharing. The packet data network 102A, such as an IP network No. 1, is coupled to the dispatching clients 130 and the dispatching service node 170 for handling the data packets for PTT services. The packet data network 102B, such as an IP network No. 2, is coupled to the PCFs 152 and the PDSN 154 for handling the data packets for the normal packet data services. The general operations of the trunking system in FIG. 1 remain essentially unchanged when applied to this system architecture.

Figure 10:
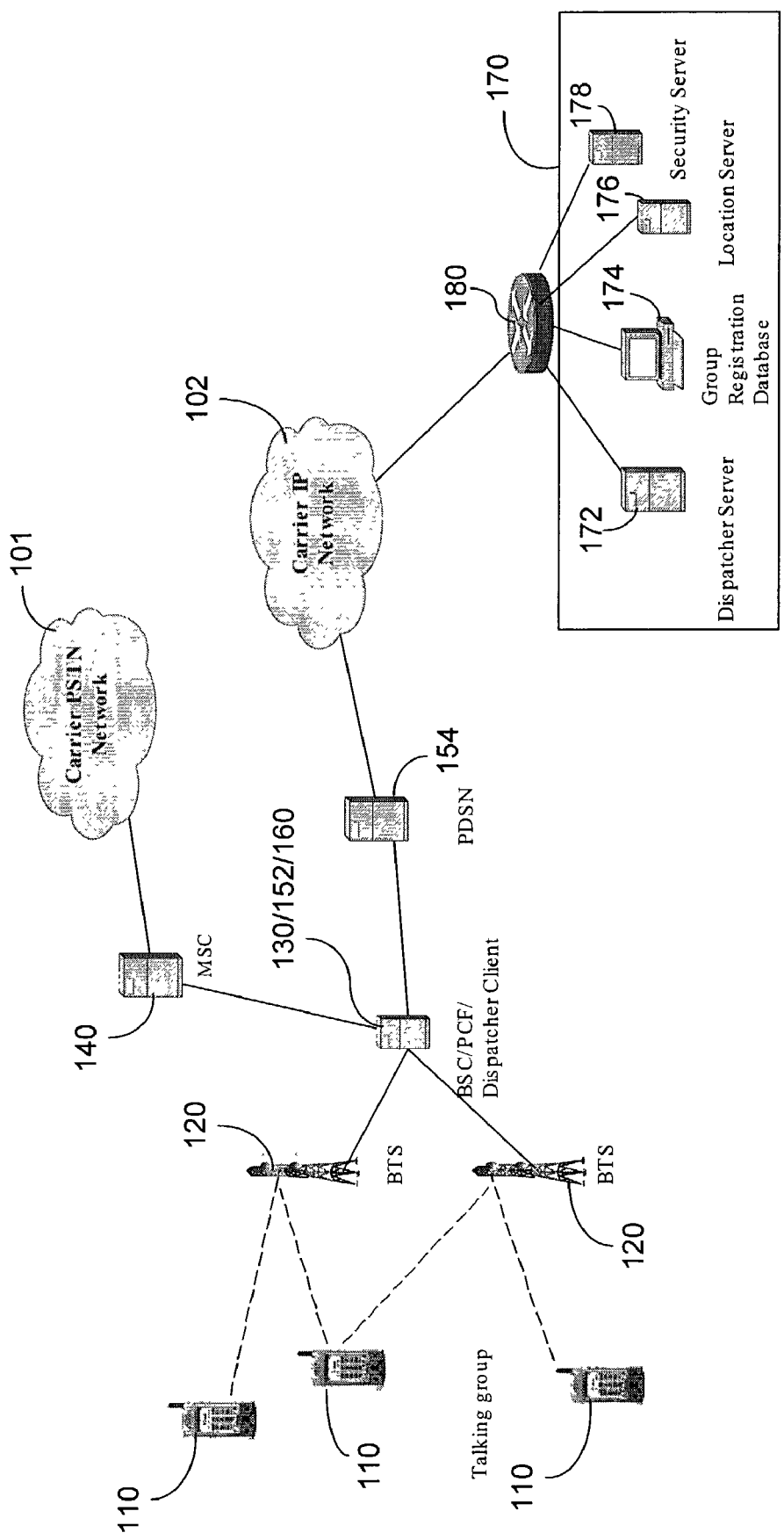
FIG. 10 shows another CDMA system with a different trunking system.

FIG. 10 shows another CDMA system with a different trunking system where the PDSN 154 is connected between the dispatching client 160 and the dispatching service node 170. This system can be controlled to perform similar group call functions as described for the system in FIG. 1. However, since the PDSN 154 is located in the path between the dispatching clients 160 and the dispatching server 172, this may cause additional latency.

In addition, the above trunking systems may be designed to provide "always-on" services for group calls to eliminate initial dialing to the service carrier. Moreover, each dispatching client 160 may be connected to two or more base station controllers 130.

Only a few implementations are disclosed. However, it is understood that variations and enhancements may be made without departing from the spirit of and are intended to be encompassed by the following claims.

What is claimed is:

1. A CDMA communication system, comprising:
  a plurality of base transceiver stations spatially distributed to communicate with mobile communication devices via radio links;
  a plurality of base station controllers, each coupled to a plurality of base transceiver stations;
  a mobile switching center connected to couple said base station controllers to a public telephone network;
  a data communication system comprising (1) a plurality of packet control function devices respectively connected to said base station controllers to transmit data packets to and from the mobile communication devices via said base transceiver stations, and (2) a packet data serving node connected to said packet control function devices to provide packet data services to the-mobile communication devices; and
  a trunking system comprising (1) a plurality of dispatching clients respectively connected to said base station controllers to transmit data packets of group calls to and from mobile communication devices of groups of subscribers where members of each group share a common trunking data link for transmission of data packets, and (2) at least one dispatching server connected to said packet data network to communicate with said dispatching clients, wherein said dispatching server and said dispatching clients are operable in combination to provide a push-to-talk function for a group call within each group.

2. The system as in claim 1, wherein said data communication system is coupled to share said packet data network with said trunking system.

3. The system as in claim 2, wherein said packet data network is an Internet Protocol network.

4. The system as in claim 2, wherein said packet data serving node is located in a communication path between a dispatching client and said dispatching server.

5. The system as in claim 1, wherein said data communication system is coupled to a second packet data network that is separate from said packet network.

6. The system as in claim 1, wherein said packet data network is an Internet Protocol network.

7. The system as in claim 1, wherein each dispatching client communicates with a connected base station controller via a first interface to provide a path for user data traffic and a second interface to provide a signaling connection, and communicates with said dispatching server via a third interface to provide a path for user data traffic and a fourth interface to provide a signaling connection.

8. The system as in claim 7, wherein said first, said second, said third, and said fourth interfaces are A8, A9, A10, and A11 interfaces, respectively.

9. The system as in claim 7, wherein said first, said second, said third, and said fourth interfaces are not A8, A9, A10, and A11 interfaces, respectively.

10. The system as in claim 1, wherein said trunking system further includes a group registration database to store information on trunking groups and group membership, a security server to authenticate group calls, and a dispatching location server to provide location information of group members in a group call, and wherein said dispatching server is in communication with said group registration database, said security server, and said dispatching location server, and is coupled to receive group call information for processing a group call.

11. The system as in claim 10, wherein said dispatching location server is coupled to said dispatching server via said packet data network.

12. The system as in claim 10, wherein said dispatching location server is integrated with and in direction communication with said dispatching server without going through said packet data network.

13. The system as in claim 10, wherein said trunking system is configured to support permanent trunking groups that are registered in said group registration database and temporary trunking groups that are not registered in said group registration database.

14. The system as in claim 13, wherein said trunking system is configured to authorize only a selected member of a permanent trunking group to change membership of said permanent trunking group by sending a message to said group registration database.

15. The system as in claim 13, wherein said trunking system is configured to authorize any member of a temporary trunking group to change membership of said temporary trunking group by sending said dispatching server a message with a list of phone numbers of members in said temporary trunking group, without sending a message to said group registration database.

16. The system as in claim 1, wherein said trunking system further comprising additional dispatching clients and an additional dispatching server in communication with said additional dispatching clients to handle group calls in additional base station controllers and additional base transceiver stations that are not connected to said dispatching clients and said dispatching server, and wherein additional dispatching server is connected to said dispatching server.

17. The system as in claim 1, wherein said trunking system includes a message router to direct, according to a service category, a trunking message to said dispatching server through a corresponding dispatching client, a message for a packet data service to said packet data serving node, and a message for a normal voice or data call to said mobile switching center.

18. The system as in claim 1, wherein said trunking system is configured to provide a common trunking message link between each dispatching client and said dispatching server to transmit trunking messages.

19. The system as in claim 1, wherein said trunking system is configured to process trunking messages in the Short Data Burst format.

20. The system as in claim 1, wherein said trunking system is configured to include in each trunking message a data field for a group call service category, and address information for a trunking group and group members.

21. The system as in claim 1, wherein said trunking system is configured to have a protocol between each dispatching client and said dispatching server that does not have a point-to-point protocol layer.

22. The system as in claim 1, wherein said trunking system is configured to:
  page members of a trunking group in response to a group call request from said trunking group in accordance with location information of said group members provided to said dispatching server;
  authenticate said group call request by checking information on said trunking group, membership information, and information on network registration of each member; and
  disable a slotted mode in a dormant state for each mobile communication device in said trunking group.

23. The system as in claim 22, wherein, in execution of the paging, said trunking system commands a corresponding dispatching client to send a paging signal to each base station controller which locates and pages group members.

24. The system as in claim 22, wherein said trunking system commands said dispatching server to check said information on said trunking group and said membership information.

25. The system as in claim 22, wherein said information on network registration of each member is received from said mobile switching center.

26. The system as in claim 1, wherein said dispatching server is configured to include an arbitration mechanism to prioritize group call requests.

27. The system as in claim 1, wherein said trunking system is configured to release a group call after receiving a release signal from a corresponding trunking group.

28. The system as in claim 1, wherein said trunking system is configured to release a group call prior to receiving a lease signal from a corresponding trunking group.

29. The system as in claim 28, wherein said group call is formed to release after said group call remains in a dormant state for a period of time.

30. The system as in claim 1, wherein said trunking system is configured to allow a group member to join a group call during said group call.

31. The system as in claim 1, wherein said trunking system is configured to allow said dispatching server to periodically page a group member absent from an on-going group call to join said group call.

32. The system as in claim 1, wherein said mobile switching center is configured to handle billing on a group call through said trunking system.

33. The system as in claim 1, wherein said trunking system is configured to establish forward channels in a group call, said forward channels comprising:
  a forward dedicated control channel (F-DCCH) to carry signaling messages and power control information for each trunking group member, and
  a forward supplemental channel (F-SCH) that carries user data of said group call and is shared by members of said trunking group.

34. The system as in claim 33, wherein both said F-DCCH and said F-SCH are configured to share a common long code sequence among group members.

35. The system as in claim 34, wherein a common Walsh code in said F-SCH is shared by group members in a common sector in a sectorized cell arrangement.

36. The system as in claim 34, wherein a unique Walsh code is assigned to each F-DCCH for each group member.

37. The system as in claim 34, wherein said trunking system is configured to have a first power control channel on said F-DCCH and a second, independent power control channel on said F-SCH.

38. The system as in claim 1, wherein said trunking system is configured to provide a single reverse dedicated control channel (R-DCCH) to each group member of a trunking group to carry signaling messages, power control information, and user data traffic.

39. The system as in claim 1, wherein said trunking system is configured to provide to each group member of a trunking group a reverse dedicated control channel (R-DCCH) to carry signaling messages and power control information, and a reverse supplemental channel (R-SCH) to carry user data traffic.

40. The system as in claim 1, wherein said trunking system is configured to support both soft and softer handoffs.

41. The system as in claim 1, wherein said trunking system is configured to provide a common frame offset to group members of a trunking group during a group call.

42. The system as in claim 1, wherein said trunking system is configured to monitor an activity of a group call and, after no data is transmitted in said group call for a period of time, set a group call into a dormant state in which at least one physical channel is released for other services.

43. The system as in claim 42, wherein said trunking system is further configured to set said group call into said dormant state prior to expiration of said period of time when there is a shortage in system resource.

44. The system as in claim 1, wherein said trunking system is configured to include a voice loop-back avoidance mechanism in processing group calls to prevent user data sent out by a group member from coming back to said group member.

\* \* \* \* \*

UNITED STATES PATENT AND TRADEMARK OFFICE
CERTIFICATE OF CORRECTION

| | |
|---|---|
| PATENT NO. | : 7,453,837 B2 |
| APPLICATION NO. | : 10/313943 |
| DATED | : November 18, 2008 |
| INVENTOR(S) | : James Jiang et al. |

Page 1 of 1

It is certified that error appears in the above-identified patent and that said Letters Patent is hereby corrected as shown below:

Column 14, line 37 (Claim 1), delete "the-mobile" and insert --the mobile--;

Column 15, line 23 (Claim 12), delete "direction" and insert --direct--;

Column 16, line 44 (Claim 16), delete "comprising" and insert --comprises--.

Signed and Sealed this

Tenth Day of February, 2009

JOHN DOLL
*Acting Director of the United States Patent and Trademark Office*